US008843265B2

(12) United States Patent
Sager et al.

(10) Patent No.: US 8,843,265 B2
(45) Date of Patent: Sep. 23, 2014

(54) TURBO-CHARGED ENGINE PURGE FLOW MONITOR DIAGNOSTIC

(75) Inventors: Roger C. Sager, Munith, MI (US); Joshua P. Macchiavello, Northville, MI (US); Paul J. Gregor, Dexter, MI (US); Christopher G. Hadre, LaSalle (CA); Thomas H. Pruett, Westland, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 235 days.

(21) Appl. No.: 13/453,265

(22) Filed: Apr. 23, 2012

(65) Prior Publication Data

US 2013/0282230 A1 Oct. 24, 2013

(51) Int. Cl.
*G01M 3/04* (2006.01)
*G01M 15/04* (2006.01)
(52) U.S. Cl.
USPC ..... 701/33.6; 73/40.7; 73/114.39; 73/114.69; 123/520
(58) Field of Classification Search
None
See application file for complete search history.

(56) References Cited

U.S. PATENT DOCUMENTS

| 5,347,971 | A | 9/1994 | Kobayashi et al. |
| 6,247,458 | B1 | 6/2001 | Heinemann et al. |
| 6,314,797 | B1 * | 11/2001 | Dawson et al. ................. 73/49.2 |
| 6,327,901 | B1 * | 12/2001 | Dawson et al. ............ 73/114.39 |
| 6,363,919 | B1 * | 4/2002 | Isobe et al. .................... 123/520 |
| 2006/0249126 | A1 | 11/2006 | Hurley |
| 2009/0266147 | A1 * | 10/2009 | Maegawa ....................... 73/40.7 |
| 2010/0224171 | A1 | 9/2010 | Peters et al. |
| 2013/0220282 | A1 | 8/2013 | Hadre et al. |

OTHER PUBLICATIONS

International Search Report dated Jun. 28, 2013 for International Application No. PCT/US2013/032795, International Filing Date Mar. 18, 2013.
Written Opinion dated Jun. 28, 2013 for International Application No. PCT/US2013/032795, International Filing Date Mar. 18, 2013.

* cited by examiner

*Primary Examiner* — James Trammell
*Assistant Examiner* — Demetra Smith-Stewart
(74) *Attorney, Agent, or Firm* — Ralph E Smith

(57) ABSTRACT

A method for testing the evaporative emission system of a vehicle. The method provides for testing the evaporative emission system of a vehicle having a forced induction engine. The method includes controlling a vacuum bypass valve and a purge flow control valve to create the necessary conditions to perform the testing of the evaporative emission system.

12 Claims, 5 Drawing Sheets

TURBO-CHARGED ENGINE PURGE FLOW MONITOR DIAGNOSTIC

FIELD

The present disclosure relates to an engine purge flow monitor diagnostic for a turbocharged engine, and, more particularly, to an engine purge flow monitor diagnostic for a turbocharged engine using a vacuum bypass valve and a purge flow control valve.

BACKGROUND

Modern internal combustion engines are typically fed fuel from a fuel tank system. The fuel tank system usually includes an evaporative emission control system ("EVAP system") that collects fuel vapors generated by fuel in the fuel tank system. These fuel vapors, among other things, pose an environmental and safety hazard. A typical EVAP system includes a canister connected to the fuel tank that collects and stores fuel vapors emitted from the fuel tank. A purge valve is usually located between an intake manifold of the engine and the canister. It is desirable to check the EVAP system to ensure that it does not contain any leaks. An electronic controller controls the components of the typical EVAP system to determine whether a leak is present. A typical test method, as disclosed in U.S. Pat. No. 6,314,797, creates a vacuum in the EVAP system and monitors the system pressure to determine whether a leak is occurring.

Many engines in modern automobiles are fed compressed air by a turbocharger, supercharger, or some other device. These forced induction engines usually include vacuum ejector tee hardware in the EVAP system. The vacuum ejector tee typically includes integrated check valves to prevent the backflow of air from the forced induction engine into the evaporative system. However, the addition of the vacuum ejector tee prevents the proper vacuum from forming in the fuel tank system for the EVAP system test.

What is needed, therefore, is a method for testing the EVAP system in a forced induction engine.

SUMMARY

In one form, the present disclosure provides a diagnostic method for an evaporative emission control system for a vehicle having an engine including a fuel tank pressure sensor, a purge flow control valve, and a vacuum bypass valve. The method includes closing the purge flow control valve, opening the vacuum bypass valve, and initiating a timer. The method also includes determining whether the pressure sensed by the fuel tank pressure sensor is stabilized. If the pressure sensed by the fuel tank pressure sensor is stabilized, the method includes closing the vacuum bypass valve and recording an initial reading from the fuel tank pressure sensor, opening the purge flow control valve a predetermined amount, and determining whether the timer has expired. If the timer has not expired, the method includes determining whether the pressure sensed by the fuel tank pressure sensor is greater than or equal to the initial reading from the fuel tank pressure sensor. If the pressure sensed by the fuel tank pressure sensor is greater than or equal to the initial reading from the fuel tank pressure sensor, the method includes closing the purge flow control valve and completing the test method successfully.

In another form, the present disclosure provides a diagnostic method for an evaporative emission control system for a forced induction vehicle having a vacuum bypass valve and an evaporative system integrity monitor including an evaporative system integrity monitor switch. The method includes initiating a timer, opening the vacuum bypass valve, and determining whether the evaporative system integrity monitor switch is open. If the evaporative system integrity monitor switch is open, the method includes closing the vacuum bypass valve and successfully completing the method.

Further areas of applicability of the present disclosure will become apparent from the detailed description provided hereinafter. It should be understood that the detailed description, including disclosed embodiments and drawings, are merely exemplary in nature intended for purposes of illustration only and are not intended to limit the scope of the invention, its application or use. Thus, variations that do not depart from the gist of the invention are intended to be within the scope of the invention.

DETAILED DESCRIPTION

Figure 1:
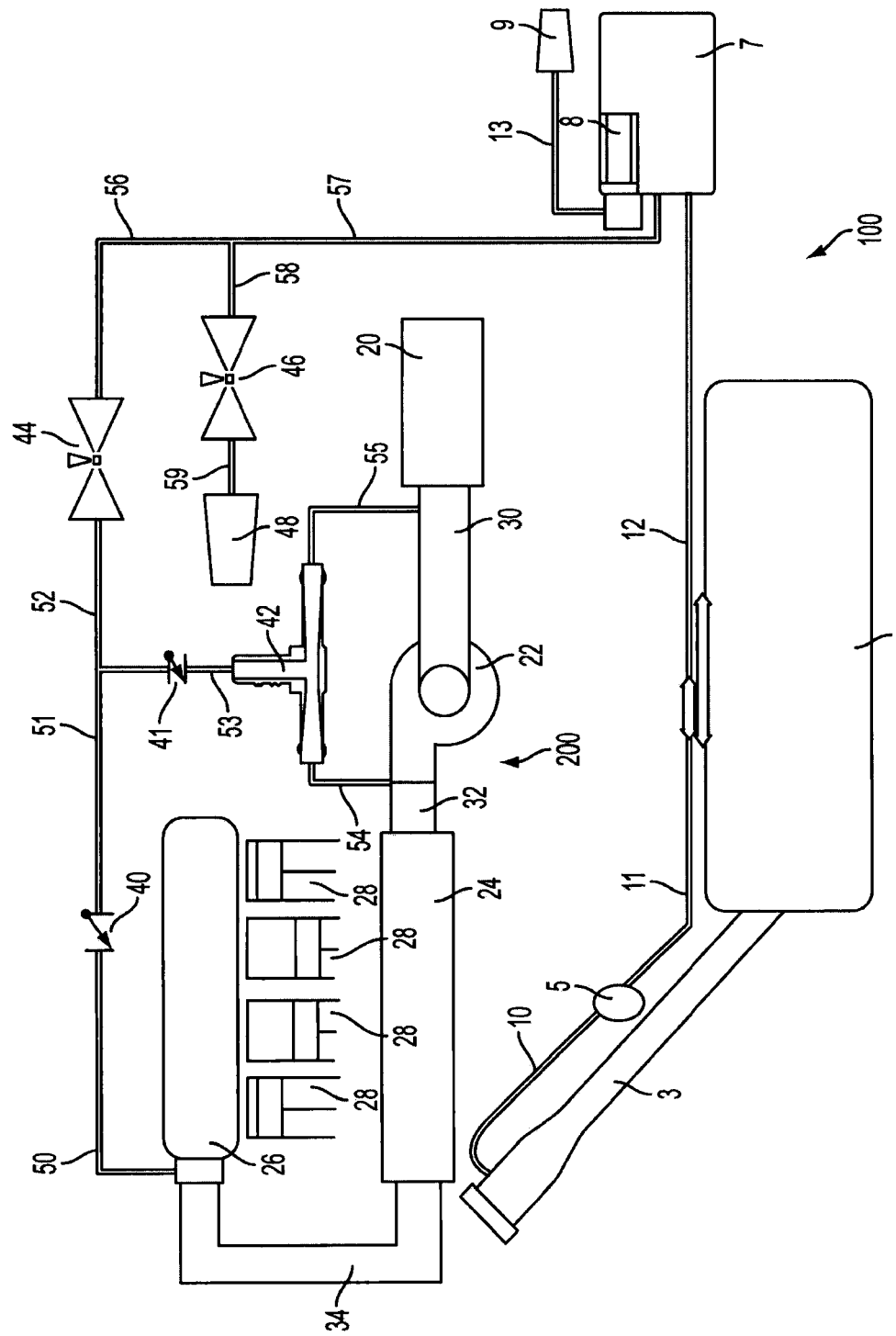
FIG. 1 is a diagram of an engine fitted with an exemplary EVAP system according to the principles of the present disclosure.

FIG. 1 illustrates an engine fitted with an exemplary EVAP system 100 according to the principles of the present disclosure. An engine intake system 200 includes an airbox 20 connected by piping 30 to an air intake of a turbocharger 22. An air output of the turbocharger 22 is connected by piping 32 to an inlet of a charge air cooler 24 that cools the air exiting the turbocharger 22. An outlet of the charge air cooler 24 is connected by piping 34 to the inlet of an intake manifold 26 of the internal combustion engine. The intake manifold 26 is coupled to at least one engine cylinder 28.

The exemplary EVAP system 100 includes a fuel tank 1 having a fuel fill tube 3, which is removably sealed on an end opposite the fuel tank 1. The fuel fill tube 3 is connected by a vacuum hose 10 to a fuel tank pressure sensor 5. The fuel tank pressure sensor 5 is connected by vacuum hose 11 to the fuel tank 1.

The fuel tank 1 is also connected by vacuum hose 12 to a canister 7. In one embodiment, the canister 7 collects and stores fuel vapors emitted from the fuel tank 1. The canister 7 includes an evaporative system integrity monitor 8 ("ESIM"). The ESIM 8 is coupled to an air filter 9 by vacuum hose 13 to allow the ESIM 8 to adjust the air pressure within the EVAP system 100 as necessary. The ESIM 8 includes a passive mechanical switch that permits air to flow between the canister 7 and atmosphere through vacuum hose 13 and the filter 9.

The canister 7 is also connected by vacuum hose 57 to vacuum hose 58 connected to a first side of a vacuum bypass valve 46. A second side of the vacuum bypass valve 46 is coupled by vacuum hose 59 to an air filter 48. The vacuum bypass valve 46 may be selectively opened or closed by an electronic controller to allow air pressure within the EVAP system 100 to be adjusted in relation to atmospheric pressure through the air filter 48. The vacuum hose 57 connected to the canister 7 is also connected to vacuum hose 56 connected to a first side of a purge flow control valve 44. A second side of the purge flow control valve 44 is connected to vacuum hose 52. The purge flow control valve 44 may be selectively opened or closed by the electronic controller to permit air within the EVAP system 100 to flow through the purge flow control valve 44.

Vacuum hose 52 is connected to a one-way check valve 41, which is coupled by vacuum hose 53 to a first port of a vacuum ejector tee 42. The one-way check valve 41 permits the flow of air in a single direction. In the EVAP system 100 of FIG. 1, air is permitted to flow through the one-way check valve 41 towards the vacuum ejector tee 42. Air is not permitted to flow through the one-way check valve 41 in a direction away from the vacuum ejector tee 42. A second port of the vacuum ejector tee 42, perpendicular to the first port, is connected to a vacuum hose 55 connected to piping 30 of the engine intake system 200. A third port of the vacuum ejector tee 42, perpendicular to the first port and opposite the second port, is connected to a vacuum hose 54 connected to piping 32 of the engine intake system 200. When the turbocharger 22 generates positive pressure in the engine intake system 200, pressurized air flows from piping 32 through vacuum hose 54 and through the second and third ports of the vacuum ejector tee 42. The flow of air through the second and third ports of the vacuum ejector tee 42 creates a vacuum on the first port of the vacuum ejector tee 42 and causes air to be pulled out of the EVAP system 100 through the one-way check valve 41 and into the first port of the vacuum ejector tee 42. The air flow from the first and third ports of the vacuum ejector tee 42 exits the second port of the vacuum ejector tee 42 and is returned to the engine intake system 200 through vacuum hose 55 and piping 30.

Vacuum hose 52 is also connected by vacuum hose 51 to a second one-way check valve 40. The one-way check valve 40 is connected by vacuum hose 50 to the intake manifold 26 of the engine intake system 200. The one-way check valve 40 permits the flow of air in a single direction. In the EVAP system 100 of FIG. 1, air is permitted to flow through the one-way check valve 40 towards the intake manifold 26. Air is not permitted to flow through the one-way check valve 40 in a direction away from the intake manifold 26. When the turbocharger 22 is not generating positive air pressure, the intake manifold 26 is operating under vacuum. Thus, air from the EVAP system 100 is drawn through the one-way check valve 40 towards the intake manifold 26 creating vacuum in the EVAP system 100. The one-way check valve 40 is closed when the turbocharger 22 is generating positive air pressure.

The electronic controller (not shown) is in electronic communication with the fuel tank pressure sensor 5, ESIM 8, purge flow control valve 44, and vacuum bypass valve 46. The electronic controller monitors the pressure in the EVAP system 100 through the fuel tank pressure sensor 5. In addition, the electronic control monitors the status of the ESIM 8 switch to determine whether it is opened or closed. The electronic controller also controls the opening and closing of the purge flow control valve 44 and vacuum bypass valve 46.

Figure 2:
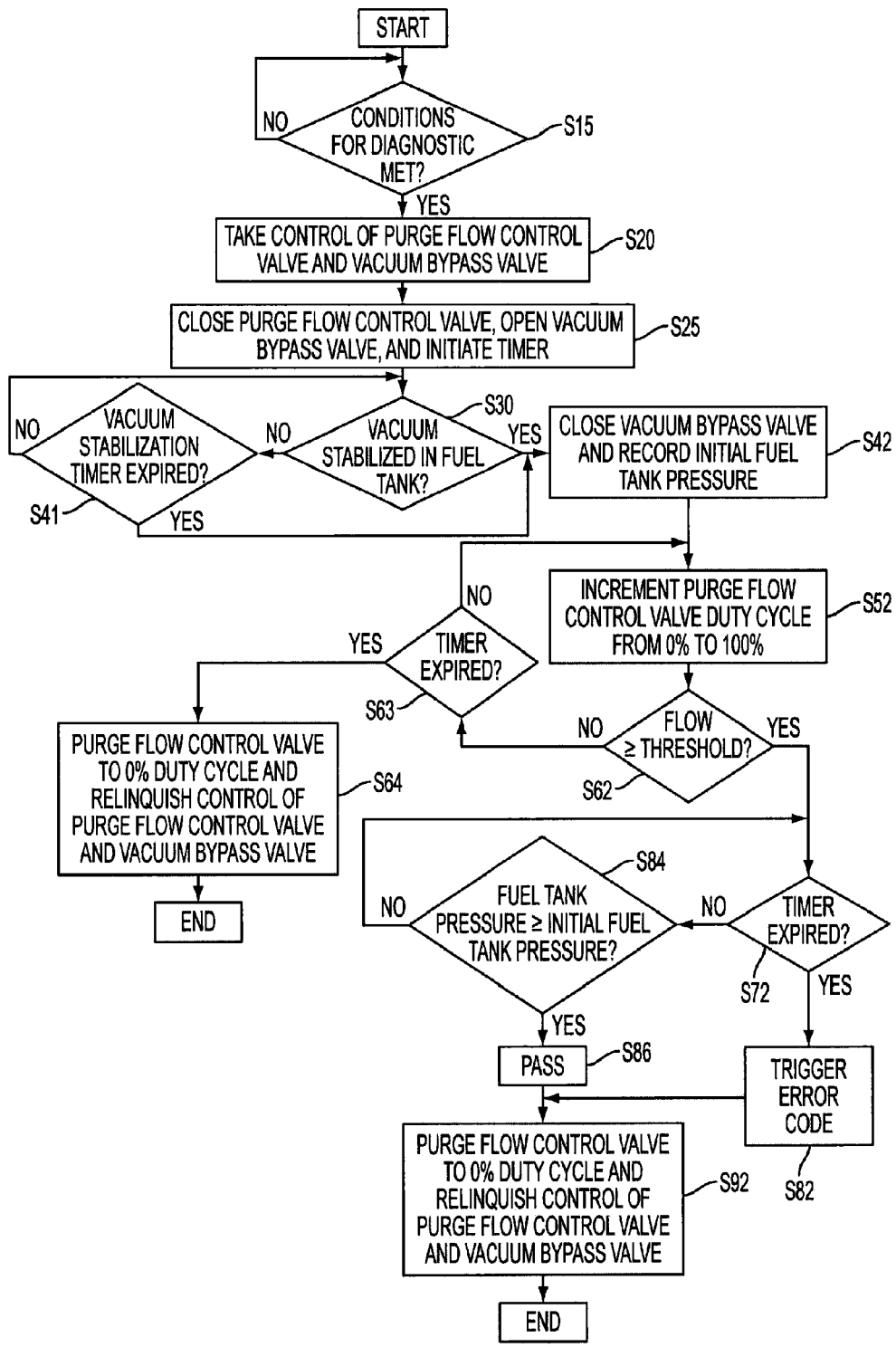
FIG. 2 is a flowchart for a first EVAP system pressure test of the EVAP system of FIG. 1.

FIG. 2 is a flowchart for a first EVAP system 100 pressure test of the EVAP system 100 of FIG. 1. The flowchart of FIG. 2 depicts the test method for an EVAP system 100 turbo purge flow monitor test. The test is initiated. At S15, the electronic controller determines whether the conditions for the EVAP system 100 turbo purge flow monitor test are satisfied. In one embodiment, the conditions are satisfied if (1) the turbocharger 22 is generating positive air pressure in the engine intake system 200; (2) the engine has achieved normal operating temperature; (3) the engine is operating in a closed loop fuel control; (4) the ambient atmospheric pressure is between 74.5 and 110 kPa; and (5) the ambient temperature is between 40° F. and 90° F. In one embodiment, any combination and number of the above conditions or additional conditions may be tested. Moreover, the pressure and temperature ranges are for exemplary purposes only. Any pressure or temperature range may be employed. The test may be stopped or held at S15 until the conditions for the test are satisfied.

In the event the conditions at S15 are satisfied, the electronic controller takes control of the purge flow control valve 44 and vacuum bypass valve 46 at S20 from the normal operating electronics of the vehicle. Because the turbocharger 22 is generating positive pressure (S15), the purge flow control valve 44 is already closed. At S25, the electronic controller opens the vacuum bypass valve 46 and initiates a timer and a vacuum stabilization timer. The timer measures the time from the start of S25 to a subsequent step in the method. Likewise, the vacuum stabilization timer measures the time from the start of S25 to a subsequent step in the method. In one embodiment, the timer and vacuum stabilization timer may be the same timer but may measure the time to different events and expire at the same or different times. In one embodiment, the timer and vacuum stabilization timer may be different timers.

At S30, the electronic controller monitors the fuel tank pressure sensor 5 to determine whether air pressure has stabilized within the fuel tank 1. In the event air pressure has not stabilized in the fuel tank 1, the electronic controller determines whether the vacuum stabilization timer has expired at S41. In one embodiment, the vacuum stabilization timer expires 30 seconds after being activated at S25. In one embodiment, the vacuum stabilization timer may expire sooner than or later than 30 seconds.

In the event the vacuum stabilization timer has not expired (S41), the electronic controller continues to determine whether the air pressure has stabilized within the fuel tank 1 (S30). In the event the vacuum stabilization timer has expired (S41), the electronic controller closes the vacuum bypass valve 46 and records the pressure measured by the fuel tank pressure sensor 5 (S42).

In the event the air pressure has stabilized within the fuel tank 1 (S30) before the vacuum stabilization timer expires (S41), the electronic controller closes the vacuum bypass valve 46 and records the pressure measured by the fuel tank pressure sensor 5 (S42). The electronic controller than increments the opening of the purge flow control valve 44 from 0% to 100% with 0% representing a fully closed purge flow control valve 44 and 100% representing a fully open purge flow control valve 44 (S52). The opening of the purge flow control valve 44 is performed in steps; after each stepped opening, the electronic controller determines whether the flow through the purge flow control valve 44 exceeds a threshold amount (S62). If the threshold amount is not exceeded (S62), the electronic controller determines whether the timer has expired (S63). In one embodiment, the timer expires 90 seconds after being activated at S25. In one embodiment, the timer may expire sooner than or later than 90 seconds. If the timer has not expired (S63), the method repeats starting at S52. In the event the timer has expired (S63), the EVAP system 100 has failed the test method. In one embodiment, an error code may be triggered to alert the vehicle operator of the failure. The electronic controller then returns the purge flow control valve 44 to 0% (i.e., closes the purge flow control valve 44) and relinquishes control of the purge flow control valve 44 and vacuum bypass valve 46 (S64) to the normal operating electronics of the vehicle. The method then ends.

In the event the flow through the purge flow control valve 44 exceeds the threshold amount (S62), the method moves on to the next step (S72). In one embodiment, the threshold amount may be the minimum amount of flow through the purge flow control valve 44 necessary to successfully perform the test method. The threshold amount may vary depending upon the geometry of the EVAP system 100. However, even if the method moves on to the next step, the purge flow control valve 44 continues to be stepped open until it is 100% open. In one embodiment, the purge flow control valve 44 may be opened in increments of 0%, 20%, 50%, 70%, and 100%. In one embodiment, any number and size of increments may be used.

Once the flow through the purge flow control valve 44 exceeds the threshold value (S62), the controller determines whether the timer has expired (S72). In the event the timer has expired (S72), the EVAP system 100 has failed the test method and an error code is triggered to alert the vehicle operator of the failure (S82). The electronic controller then returns the purge flow control valve 44 to 0% (i.e., closes the purge flow control valve 44) and relinquishes control of the purge flow control valve 44 and vacuum bypass valve 46 (S92) to the normal operating electronics of the vehicle. The method is completed unsuccessfully.

In the event the timer has not expired (S72), the electronic controller determines whether the pressure reported by the fuel tank pressure sensor 5 is greater than or equal to the initial pressure reported by the fuel tank pressure sensor 5 at S42 (S84). Because the fuel tank is under vacuum, the initial pressure reported by the fuel tank pressure sensor 5 and the pressure reported by the fuel tank pressure sensor 5 are negative pressures. Thus, for the purposes of the present method, a greater pressure will indicate a pressure that is less negative. The EVAP system 100 successfully passes the turbo purge flow monitor test if the pressure reported by the fuel tank pressure sensor 5 is greater than or equal to the initial pressure reported by the fuel tank pressure sensor 5 at S42 (S86). The electronic controller then returns the purge flow control valve 44 to 0% (i.e., closes the purge flow control valve 44) and relinquishes control of the purge flow control valve 44 and vacuum bypass valve 46 (S92) to the normal operating electronics of the vehicle. The test method is completed successfully. If the pressure reported by the fuel tank pressure sensor 5 is not greater than or equal to the initial pressure reported by the fuel tank pressure sensor 5 at S42 (S84), the electronic controller repeats the method starting at S72.

Figure 3:
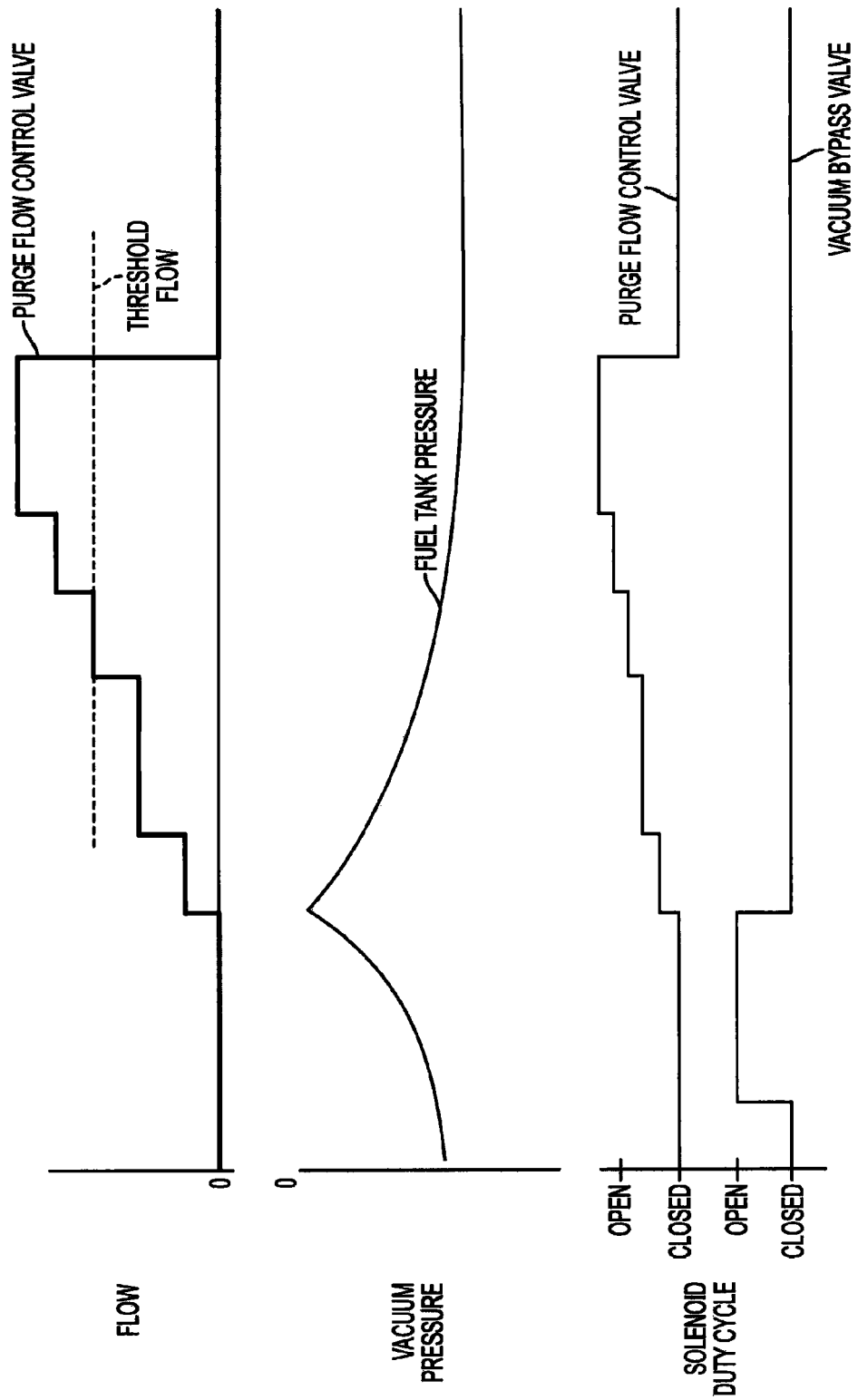
FIG. 3 is a graph of flow, pressure, and solenoid duty cycle during the first EVAP system test.

FIG. 3 is a graph of flow, pressure, and solenoid duty cycle during the first EVAP system 100 test of FIG. 2. FIG. 3 depicts an EVAP system 100 test in which the vacuum pressure in the fuel tank 1 is stabilized at S30. The uppermost plot depicts the flow through the purge flow control valve 44 during the test method of FIG. 2. Initially, the purge flow control valve 44 is closed. At S52, the purge flow control valve 44 is incrementally opened from 0% open to 100% open. The uppermost plot shows a corresponding increase in air flow through the purge flow control valve 44 with each incremental opening. In the example of FIG. 3, the threshold flow level is reached at the third incremental opening of the purge flow control valve 44. At S92 the purge flow control valve 44 is closed and the air flow through the purge flow control valve 44 is stopped.

The middle plot of FIG. 3 depicts the air pressure in the fuel tank 1 as determined by the fuel tank pressure sensor 5 during the test method of FIG. 2. At S25, the vacuum bypass valve 46 is opened allowing the vacuum in the EVAP system 100 and fuel tank 1 to decrease towards zero. The air pressure in the fuel tank 1 peaks close to zero at S42 as the vacuum bypass valve 46 is closed. This approximately coincides with the opening of the purge flow control valve 44 and the start of air flow through the purge flow control valve 44. The air pressure in the fuel tank 1 immediately begins to decrease to a higher vacuum level as the purge flow control valve 44 is incrementally opened at S52. The fuel tank 1 air pressure levels out as the test method completes.

The lowermost plot of FIG. 3 depicts the duty cycle of the solenoids that control the purge flow control valve 44 and the vacuum bypass valve 46 during the test method of FIG. 2. The vacuum bypass valve 46 is opened first and remains open until the purge flow control valve 44 is opened. The vacuum bypass valve 46 is closed slightly before the purge flow control valve 44 is opened. The timing of the closing of the vacuum bypass valve 46 and the opening of the purge flow control valve 44 approximately coincides with the lowest vacuum air pressure achieved in the fuel tank 1. The purge flow control valve 44 is incrementally opened at S52. The incremental opening (S52) of the purge flow control valve 44 corresponds to the incremental increases in the air flow through the purge flow control valve 44 depicted in the uppermost plot of FIG. 3.

Figure 4:
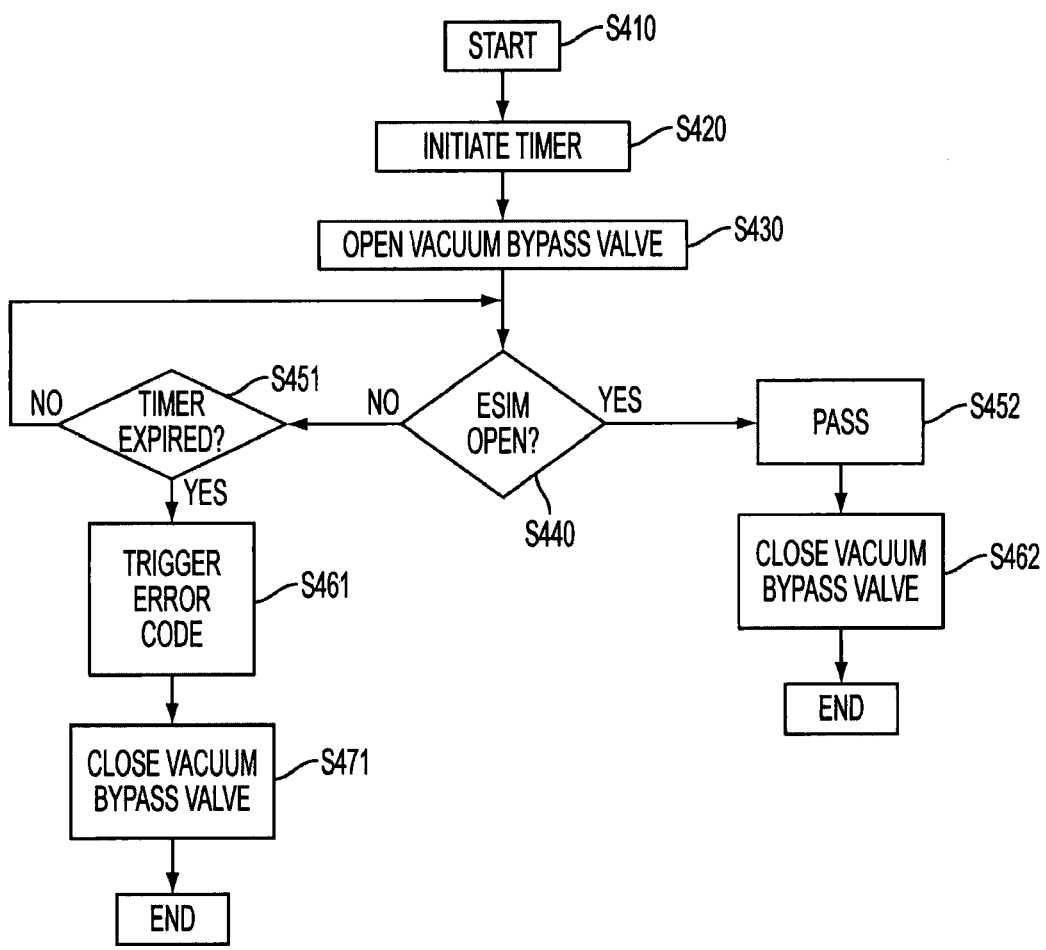
FIG. 4 is a flowchart for a second EVAP system pressure test of the EVAP system of FIG. 1.

FIG. 4 is a flowchart for a second EVAP system 100 pressure test of the EVAP system 100 of FIG. 1. The flowchart of FIG. 4 depicts the test method for an EVAP system 100 ESIM 8 functionality test. Specifically, the method of FIG. 4 depicts an ESIM 8 switch stuck closed test. The test method of FIG. 4 is performed after the engine has been turned off. The test is initiated. At S420, the electronic controller initiates a timer. The timer measures the time from the start of S420 to a subsequent step in the method. The electronic controller next opens the vacuum bypass valve 46 (S430). At S440, the electronic controller determines whether the ESIM 8 switch is open. In the event the ESIM 8 switch is open, the EVAP system 100 passes the test method (S452). The electronic controller subsequently closes the vacuum bypass valve 46 (S462) and the test method is completed successfully.

In the event the ESIM 8 switch is not open at S440, the electronic controller determines whether the timer has expired (S451). In one embodiment, the timer expires 90 seconds after being activated at S420. If the timer has not expired (S451), the method is repeated starting at S440. If the timer has expired (S451), the EVAP system 100 fails the test and an error code is triggered to alert the vehicle operator to the failure (S461). The electronic controller subsequently closes the vacuum bypass valve 46 (S471) and the test method is completed unsuccessfully.

Figure 5:
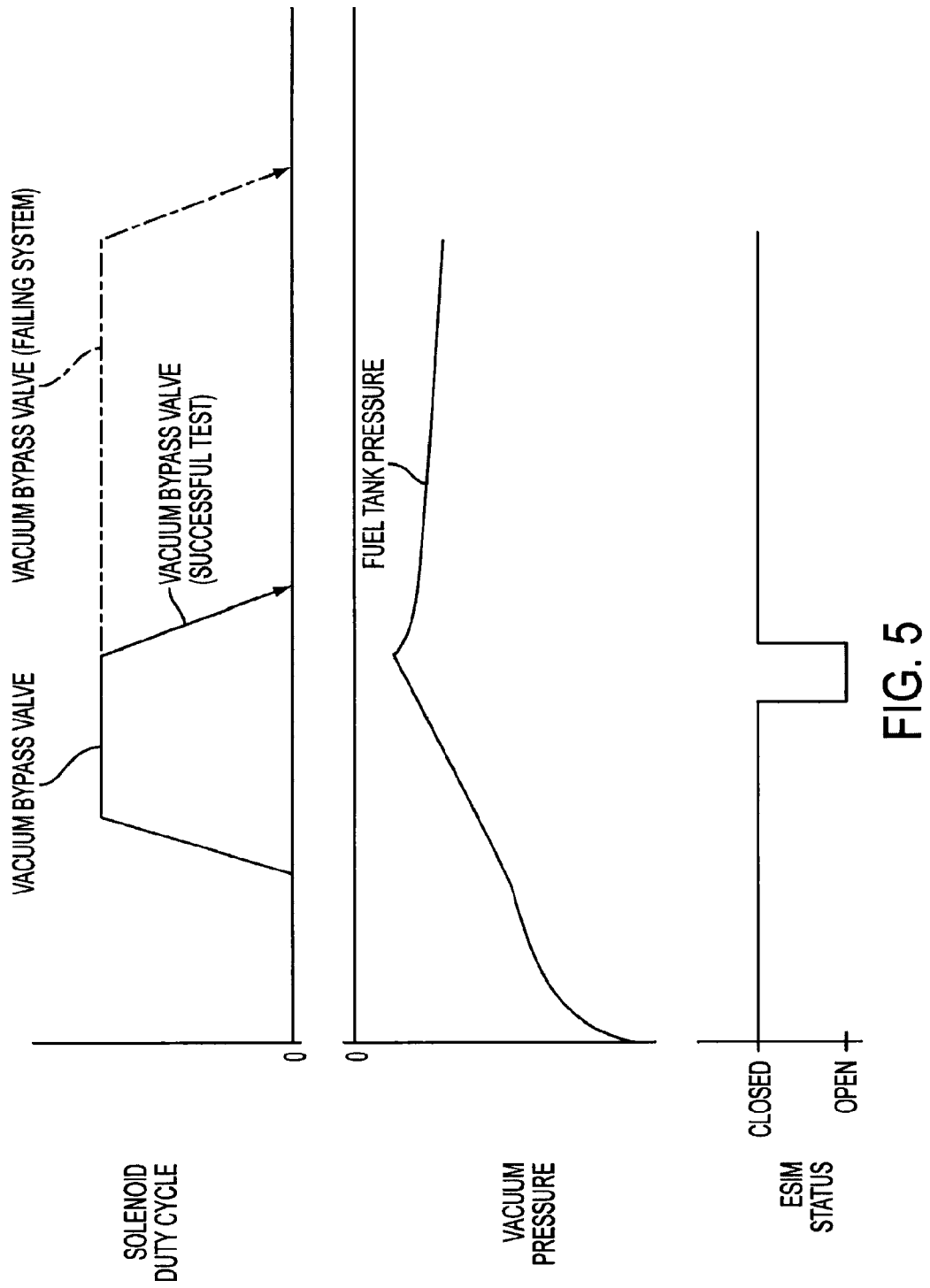
FIG. 5 is a graph of solenoid duty cycle, pressure, and ESIM status during the second EVAP system test.

FIG. 5 is a graph of solenoid duty cycle, pressure, and ESIM 8 status during the second EVAP system 100 test of FIG. 4. The uppermost plot depicts the solenoid duty cycle of the vacuum bypass valve 46 during the test method of FIG. 4. Initially, the vacuum bypass valve 46 is closed. At S430, the vacuum bypass valve 46 is opened from 0% to 100% open. The solid line represents a successful test of the ESIM 8 switch. The dashed line represents an unsuccessful test of the ESIM 8 switch. In the successful test, the vacuum bypass valve 46 closes (S462) shortly after the ESIM 8 switch opens (S440). The ESIM 8 switch for a successful EVAP system 100 test is depicted opening in the lowermost plot of FIG. 5. In the unsuccessful test, represented by the dashed line, the ESIM 8 switch does not open at all. Instead, the vacuum bypass valve 46 is closed (S471) after the timer expires (S451).

The middle plot of FIG. 5 depicts the air pressure in the fuel tank 1 as determined by the fuel tank pressure sensor 5 during the test method of FIG. 4 that is successfully completed. At S430, the vacuum bypass valve 46 is opened allowing the vacuum in the fuel tank 1 to decrease towards zero. The air pressure in the fuel tank 1 peaks close to zero at S440 as the ESIM 8 switch opens. The vacuum bypass valve 46 is closed (S462) and the test method is successfully completed.

The lowermost plot of FIG. 5 depicts the status of the ESIM 8 switch. The ESIM 8 switch opens approximately as the pressure in the fuel tank 1 peaks close to zero. The ESIM 8 switch then closes a short time later as the vacuum pressure in the fuel tank 1 increases to a higher vacuum level.

It should be understood that the embodiment depicted in FIG. 1 is for representative purposes only. The method may be used in an EVAP system 100 having an engine intake system 200 having any desired arrangement. In one embodiment, any number or arrangement of the engine cylinders 28, intake manifolds 26, piping 30, 32, 34, air filter 20, turbocharger 22, and charge air cooler 24 may be used. In one embodiment, the turbocharger 22 may be replaced by a supercharger or any other forced induction device. In addition, any arrangement of an EVAP system 100 having at least one purge flow control valve 44 and vacuum bypass valve 46 may be used.

Thus, a method for testing the EVAP system in a turbocharged engine is provided. The method is capable of providing the necessary conditions for performing a turbo purge flow monitor test of the EVAP system. The method is also capable of providing the necessary conditions for testing the functionality of the ESIM switch.

What is claimed is:

1. A diagnostic method for an evaporative emission control system for a vehicle having an engine comprising a fuel tank pressure sensor, a purge flow control valve, and a vacuum bypass valve, said method comprising:
    (a) closing the purge flow control valve, opening the vacuum bypass valve, and initiating a timer;
    (b) determining whether the pressure sensed by the fuel tank pressure sensor is stabilized;
    (c) if the pressure sensed by the fuel tank pressure sensor is stabilized:
    (d) closing the vacuum bypass valve and recording an initial reading from the fuel tank pressure sensor,
    (e) opening the purge flow control valve a predetermined amount,
    (f) determining whether the timer has expired;
    (g) if the timer has not expired, determining whether the pressure sensed by the fuel tank pressure sensor is greater than or equal to the initial reading from the fuel tank pressure sensor, and
    (h) if the pressure sensed by the fuel tank pressure sensor is greater than or equal to the initial reading from the fuel tank pressure sensor, closing the purge flow control valve and completing the test method successfully;
    (i) initiating a vacuum stabilization timer contemporaneously with the timer; and
    if at said step (b) of determining whether the pressure sensed by the fuel tank pressure sensor is stabilized, the pressure sensed by the fuel tank pressure sensor is not stabilized;
    (j) determining whether the vacuum stabilization timer has expired, and
        if the vacuum stabilization timer has not expired, repeating said method starting at said step of (b) determining whether the pressure sensed by the fuel tank pressure sensor is stabilized.

2. The method of claim 1, further comprising:
    after said step (e) of opening the purge flow control valve a predetermined amount, (k) determining whether airflow through the purge flow control valve exceeds a predetermined threshold amount;
    (l) if the airflow through the purge flow control valve does not exceed a predetermined threshold amount, (m) determining whether the timer has expired and repeating said method starting at said step (e) of opening the purge flow control valve a predetermined amount if the timer has not expired;
    once the airflow through the purge flow control valve exceeds the predetermined threshold amount, performing said step (f) of determining whether the timer has expired; and
    (n) if the timer has expired, closing the purge flow control valve and completing the test method unsuccessfully.

3. The method of claim 2, further comprising, if during said step (g) of determining whether the pressure sensed by the fuel tank pressure sensor is greater than or equal to the initial reading from the fuel tank pressure sensor the pressure sensed by the fuel tank pressure sensor is not greater than or equal to the initial reading from the fuel tank pressure sensor, repeating said method starting at said step of (f) determining whether the timer has expired.

4. The method of claim 2, wherein the purge flow control valve is opened entirely regardless of when the airflow through the purge flow control valve exceeds the predetermined threshold amount.

5. The method of claim 2, further comprising transmitting an error code to a vehicle operator if said test method is completed unsuccessfully.

6. The method of claim 1, further comprising determining whether at least one predetermined condition is satisfied prior to said step of (a) closing the purge flow control valve, opening the vacuum bypass valve, and initiating the timer and vacuum stabilization timer, and not closing the purge flow control valve, opening the vacuum bypass valve, and initiating the timer and vacuum stabilization timer until the at least one predetermined condition is satisfied.

7. The method of claim 6, wherein at least one of the predetermined conditions is selected from the group comprising detecting an ambient atmospheric pressure between 74.5 and 110 kPa, detecting an ambient temperature between 40° F. and 90° F., detecting positive air pressure in an engine intake system, and detecting the engine operating at normal operating temperature, and detecting the engine operating in a closed loop fuel control method.

8. The method of claim 6, further comprising an electronic controller in communication with the fuel tank pressure sensor, the purge flow control valve, and the vacuum bypass valve, wherein the electronic controller seizes control of the purge flow control valve and the vacuum bypass valve if the predetermined conditions are satisfied.

9. The method of claim 8, wherein the electronic controller relinquishes control of the purge flow control valve and the vacuum bypass valve prior to completion of said method.

10. The method of claim 1, further comprising triggering an error code if the timer expires.

11. The method of claim 1, wherein the predetermined amount of opening the purge flow control valve is 20%.

12. The method of claim 11, wherein the additional predetermined amounts of opening the purge flow control valve are 50%, 70%, and 100%.

* * * * *